2,998,356
STEAM DISTILLATION OF N,N-DIETHYLTOLU-AMIDE

Frederick E. Williams, Newark, Del., assignor to Hercules Powder Company, Wilmington, Del., a corporation of Delaware
No Drawing. Filed Dec. 6, 1957, Ser. No. 700,942
6 Claims. (Cl. 202—46)

This invention relates to the purification and recovery by distillation of N,N-diethyl toluamides, more particularly, N,N-diethyl-m-toluamide, which has recently been found to be an excellent insect repellent.

The compound N,N-diethyl-m-toluamide is known and its preparation by reaction between diethylamine and the acid chloride of m-toluic acid is recorded in the literature. When it became desirable to produce the compound commercially, various procedures were investigated. It was found that it could be prepared, for example, both batchwise and continuously by either liquid phase or vapor phase reaction of diethylamine with m-toluic acid. The various processes investigated are not equivalent by any means with respect to conversions and product yields, but it became apparent that they all produced a crude amide which on ordinary fractional distillation provided a product which was unsatisfactory for repellent formulations because of the presence of odor and color bodies and other impurities.

Now in accordance with this invention, it has been found that N,N-diethyl-m-toluamide, and N,N-diethyl toluamides generally, of high purity may be produced from the corresponding crude amides by a process of fractional distillation involving closely controlled temperature conditions in the reboiler and in the primary condenser and the passage of steam continuously through the distillation column during the distillation operation. The use of steam is necessary to obtain a high purity product. This is established by the fact that reduced pressure distillation of high purity N,N-diethyl-m-toluamide under most favorable conditions, but in the absence of steam, results in degradation of the amide to give a product containing odor and color bodies which were not present in the high purity material. The reboiler temperature during distillation is in the range of 180°–225° C. The overhead vapors from the column are passed through a primary condenser so operated that the temperature of the cooling liquid leaving the condenser is in the range of 75°–110° C. This effects condensation of the major portion of the amide in the vapors. The remaining vapors are then passed through a series of recovery units involving a surge tank equipped with an entrainment separator, the steam jets which create the reduced pressure used in the distillation, and into a final tank equipped with an agitator. Additional condensers may be used, for example, immediately after the primary condenser and/or between the surge tank and steam jets. Also, the entrainment separator may be a separate unit, not incorporated in the surge tank, and is preferably located in the recovery line immediately after the primary condenser. Its purpose is to remove N,N-diethyl toluamide mist.

The material fed to the distillation process is the crude amide. The product from the reaction of toluic acid with diethylamine contains the amide and some unreacted acid and amine. This mixture may be processed in a variety of ways to obtain the crude amide used in the process of this invention. The unreacted amine may be removed by a stripping operation or by washing with sulfuric acid. The toluic acid then may be recovered by extraction with aqueous sodium hydroxide. Also the amine and acid may be removed simultaneously in the form of the water-soluble salt, diethylammonium toluate, by subjecting the reaction mixture to water washing.

The process of this invention is more particularly set forth in the following specific examples. All parts and percentages in this specification and claims are by weight unless otherwise noted.

Example 1

N,N-diethyl toluamide was prepared by liquid phase reaction of diethylamine with a 70:30 mixture of meta- and para-toluic acids. The reaction product was dissolved in toluene for the purpose of improved workability and the resulting solution was boiled to remove unreacted diethylamine. The amine-free product then was extracted several times with dilute aqueous sodium hydroxide to remove unreacted toluic acids. The toluene solvent was subsequently largely removed by distillation at 100 mm. pressure to a maximum pot temperature of 175° C.

The crude diethyl toluamide was distilled continuously in a column having an efficiency of 10–12 theoretical plates. Actually, two different distillations were carried out, the first of which was essentially a topping operation to remove the remaining toluene, the color bodies and some of the odor bodies. The second distillation was carried out to isolate a pure amide fraction. In both distillations the feed was introduced to the center of the column, superheated steam was introduced into the liquid in the reboiler and passed up through the column along with the organic vapors to be rectified, and the desired products were condensed overhead. The condensation system consisted of a first partial condenser, an entrainment separator and a final condenser. Reflux, in the form of condensed oils exclusive of water, was returned to the column in both distillations.

In both distillations the operating pressure was 50 mm. at the head of the column and in the topping operation the temperature of the reboiler was 180° C. The crude amide was fed at a rate corresponding to 5000 ml. per hour and the weight ratio of steam to feed was 1:5 (corresponding to a mole ratio of 2:1). The overhead product was collected at a rate corresponding to 450 ml. per hour. Reflux corresponding to a rate of 4250 ml. per hour, preheated to the column temperature, was returned continuously to the top of the column. The pressure drop through the column was 15 mm. From 500 pounds of crude amide fed to the column, there was recovered 461 pounds as bottoms and as overhead there was 23 pounds of wet oils and 22 pounds of dry oils. The bottoms from the topping operation then were distilled in the same column using a reboiler temperature of 190° C., a feed rate corresponding to 2500 ml. per hour, an overhead product rate corresponding to 2200 ml. per hour, a reflux rate corresponding to 4400 ml. per hour, and a steam to feed weight ratio of 1:2.5 (corresponding to a mole ratio of 4.25:1). The pressure drop throught the column was 10 mm. From the second distillation there was recovered as overhead 6.8 pounds of wet oils and 392 pounds of dry oils. The bottoms amounted to 58.5 pounds. The recovery of finished diethyl toluamide as overhead dry oils from the second distillation was 77.5%. However, further fractionation of the bottoms from the second distillation utilizing a pressure of 1 mm. resulted in the recovery of an additional 25 pounds of satisfactory diethyl toluamide. Similarly, another 20 pounds of satisfactory product was obtained from the overhead dry oils isolated in the initial topping distillation. The total recovery of amide was 86%. In addition to the further amount of diethyl toluamide recovered by distillation of the bottoms from the second distillation there also was recovered 20 pounds of monoethyl toluamide which boiled at 127–128° C. under 1 mm.

Example 2

Crude N,N-diethyltoluamide corresponding to that used in Example 1 except for being derived from a mixture of meta- and para-toluic acids in the ratio of about 87:13 and also containing the toluene used to improve workability was distilled batchwise through a 15-foot column of 15-inch internal diameter packed to a depth of 12 feet with Cannon packing.

The distillation pot was charged with 1953 pounds of the crude amide, 399 pounds of recycle material (forecuts and tailcuts from previous distillations), one pound of aqueous 50% sodium hydroxide and 8.3 pounds of water. During the distillation steam was introduced into the liquid in the pot and passed up through the column. The data obtained in the distillation are given in the following table.

The amide utilized in Example 1 was obtained through reaction of diethylamine with a mixture of meta- and para-toluic acids in the ratio of 70:30. The amides used in Examples 2 and 3 were derived from a mixture of meta- and para-toluic acids in the ratio of about 87:13. However, those diethyl toluamides prepared from other mixtures of the isomeric toluic acids also may be utilized, for example, ortho-meta, ortho-para and ortho-meta-para, and the relative amounts of the isomers may be widely varied. Furthermore, the diethyl amide of any one particular toluic acid isomer may be used. It is desirable from the standpoint of the insect repellency of the product to have at least an 80:20 mixture of meta- to para-toluic acid as a starting material and a preferred mixture is one wherein the meta to para ratio is at least 85:15. The higher the meta isomer content of the toluic acid, the more effective the diethyl toluamide product is as an insect repellent.

TABLE A

| Cut No. | Material | Weight (lb.) | Sp. Gr. | Acid No. | Temperature, °C. | | | Absolute Pressure at Head of Column (mm. of Hg) | Reflux Ratio | Ratio in Column of Steam to Organics | | Pressure Drop in Column (mm. of Hg) |
|---|---|---|---|---|---|---|---|---|---|---|---|---|
| | | | | | Pot | Vapor | Primary Condenser | | | Weight | Mole | |
| 1 | Toluene | 517 | | | 175 | 83 | 29 | atm. | | | | 5 |
| 2 | Forecut | 143 | 0.9975 | 0.01 | 175 | 148 | 100 | 30 | 10/1 | 0.070 | 0.744 | 38 |
| 3 | N,N-Diethyltoluamide | 287 | 0.9966 | 0.01 | 183–186 | 155–160 | 98–105 | 29 | 2/1 | 0.070 | 0.744 | 38–40 |
| 4 | do | 781 | 0.9964 | 0.01 | 185–186 | 161–163 | 96–98 | 30 | 2/1 | 0.077 | 0.815 | 25–33 |
| 5 | do | 338 | 0.9986 | 0.01 | 184 | 159 | 95 | 31 | 2/1 | 0.089 | 0.942 | 20–25 |
| 6 | Tailcut | 90 | | | 178 | 150 | 91 | 39 | 2/1 | 0.111 | 1.18 | 18–20 |
| | Heel | 170 | | | | | | | | | | |

The total organic material recovered amounted to 2326 pounds, representing a 98.9% recovery.

Example 3

The procedure of Example 2 was essentially repeated on a charge of 2053 pounds of crude amide, 232 pounds of recycle material, one pound of aqueous 50% sodium hydroxide and 8.3 pounds of water. Between cuts 5 and 6, there was added to the pot an additional 0.5 pound of aqueous 50% sodium hydroxide and the mixture refluxed for 20 minutes due to the increasing acid number. The pertinent data are given in the following table.

The distillation process of this invention must be operated within certain critical limits of temperature in the reboiler and in the primary condenser, which is the first condenser in line in the recovery system handling the overhead vapors from the column. The reboiler temperature must be in the range of 180°–225° C. Based on the discovery that N,N-diethyltoluamides decompose rather easily at high temperatures, it has been found that 225° C. must not be exceeded, particularly in the presence of steam, which, as pointed out earlier, is necessary to obtain a product of high purity. Even at 225° C. the length of time for holding at that temperature must be compara-

TABLE B

| Cut No. | Material | Weight (lb.) | Sp. Gr. | Acid No. | Temperature, °C. | | | Absolute Pressure at Head of Column (mm. of Hg) | Reflux Ratio | Ratio in Column of Steam to Organics | | Pressure Drop in Column (mm. of Hg) |
|---|---|---|---|---|---|---|---|---|---|---|---|---|
| | | | | | Pot | Vapor | Primary Condenser | | | Weight | Mole | |
| 1 | Toluene | 212 | | | 184 | 78 | 23 | atm. | | | | 22 |
| 2 | do | 220 | | | 198 | 98 | 26 | atm. | | | | 5–13 |
| 3 | Forecut | 63 | 0.9958 | 0.03 | 189–183 | 146–151 | 65–115 | 30 | 7/1 | 0.06 | 0.637 | 56–44 |
| 4 | N,N-Diethyltoluamide | 698 | 0.9964 | 0.04 | 188–189 | 165 | 101–115 | 30–35 | 2/1 | 0.072 | 0.761 | 32–53 |
| 5 | do | 425 | 0.9971 | 0.08 | 186–188 | 161–163 | 57–108 | 27–30 | 2/1 | 0.071 | 0.75 | 27–29 |
| 6 | do | 492 | 0.9984 | 0.02 | 183–186 | 158–163 | 93–95 | 28 | 2/1 | 0.081 | 0.863 | 18–27 |
| 7 | Tailcut | 83 | | | 175 | 140 | 90 | 32 | | | | 10–18 |
| | Heel | 16 | | | | | | | | | | |

The total organic material collected amounted to 2209 pounds, a recovery of 96.7%. Approximately three-fourths of Cut No. 4 from this example and of Cut No. 4 from Example 2 were blended together. The blend had an acid number of 0.03, a specific gravity of 0.9974, a refractive index of 1.5210, a moisture content of 0.31% (Karl Fischer method), and a color of 0.10 (Hazen). By infrared analysis it showed 90% N,N-diethyl-m-toluamide and 9% N,N-diethyl-p-toluamide, and the balance N-ethyl toluamides.

tively short. The same is true for 220° C. However, at a maximum of 200° C. the distillation may be carried out with comparatively little product decomposition. With regard to the lower limit of 180° C., it has been found that this represents the lowest temperature at which the amides will have sufficient partial vapor pressures to permit distillation using practical amounts of steam. As the reboiler temperature is decreased, it is necessary to utilize increasing amounts of steam to provide a total vapor pressure which will permit distillation. Under normal plant conditions, where condenser efficiency is directly dependent upon the temperature of the available cooling water, there is a limit to the amount of steam which may be used. At temperatures below 180° C., the amount of steam required to effect distillation becomes so great that the condenser capacity is insufficient, and both amide product and steam are lost from the system. With greater condenser capacity and more efficient cooling, as with brine, it would be possible to operate below 180° C. reboiler temperature, but this too would be impractical because the amount of steam required would add greatly to the cost of operating the process. A preferred reboiler temperature range is about 190°–200° C. Under these conditions the temperature within the column will be between about 150° C. and about 170° C.

It also is necessary to maintain the temperature of the primary condenser within certain limits, since the major portion of the N,N-diethyltoluamide product has to be separated at this point from the other constituents in the overhead vapor from the column. If the temperature of the cooling liquid leaving this condenser exceeds 110° C., the amide will be insufficiently condensed, and a large portion of it will pass on to other points in the recovery system, where it will become contaminated with the very impurities which the process is designed to remove. On the other hand, temperatures of the cooling liquid leaving the condenser which are below 75° C. cause condensation of undesirably high amounts of water. By operating above 75° C. it is possible to keep the amount of water in the amide to less than 1%. Temperatures between about 90° C. and 110° C. permit production of a product having 0.5% or less water. The temperature should be sufficiently high at the prevailing pressure in the system to insure that the water is maintained in the vapor state as steam, rather than being condensed.

It is preferable to carry out the distillation under reduced pressure, otherwise an inordinate amount of steam is required, even at the maximum reboiler temperature of 225° C., to effect any distillation. For example, a desirable range of pressure at the head of the distillation column is between 20 and 100 mm., a preferred range being between 40 and 75 mm. However, as those skilled in the art will recognize, the pressure which will be used at the head of the column will be related to the efficiency of the column itself, which in turn is related to the pressure drop in the column. A column with relatively low pressure drop will permit a higher head pressure in order to obtain the same pot or reboiler pressure as that obtained with a lower head pressure on a column having a fairly high pressure drop. It has been found that with a 15-foot column having an internal diameter of 15 inches and packed to a depth of 12 feet with 0.24 inch by 0.24 inch type 316 stainless steel protruded packing (Cannon) the distillation may be carried out at 20–75 mm., preferably 30–50 mm., pressure at the head of the column. The pressure drop in such a column will vary between about 20 and about 50 mm. during distillation of the N,N-diethyltoluamide fraction at a head pressure of about 30 mm. Columns and head pressure giving equivalent results in the form of pressures at the pot may be used.

In the particular column just described and with the head pressures utilized therewith the mole ratio of steam fed to the reboiler to amide removed overhead is between about 2:1 and about 5:1 for the reboiler temperature range of 180°–225° C. This corresponds to a weight ratio of about 1:5 to about 1:2.5. Within the column the mole ratio of stream to amide will be between about 0.5:1 and about 4:1. It will be realized, of course, that these ratios will depend again upon the particular column used and on the pressure existing at the pot. A column of low pressure drop in combination with low pressure at the head of the column will result in a relatively low pot pressure, thus enabling use of less steam. In any case, the amount of stream should be sufficient to provide a total pressure permitting distillation within the reboiler temperature range of 180°–225° C.

In the recovery system the overhead vapors from the column are condensed and some components thereof are returned to the reboiler to provide for additional recovery of amide. As has been mentioned, the major portion of the desired amide product is condensed in the primary condenser. If desired, a second condenser may be in the line immediately following the primary, and the second may be operated at a temperature of, for example, 4°–30° C. This will effect condensation of amide and water, both of which may be recycled to the distillation. Alternatively, the amide which is not condensed in the primary condenser and which is in the form of a mist is removed by an entrainment separator such as a York mesh demister. This may be either a separate unit or combined with a surge tank, which in itself aids in condensation of the amide. The odor and color bodies are first condensed, but only partially, in the surge tank. The remaining amounts are found in the steam jets and in the final tank of the recovery system. The material from the demister and surge tank may be recycled to the distillation, the amount of odor and color bodies being so small that there is no build-up of them in the distillation pot.

The distillation may be carried out either batchwise or continuously. In either case it is preferable to isolate a forecut, usually amounting to about 5% of the total feed, for the purpose of removing most of the color bodies plus some of the odor bodies. In continuous operation this is accomplished by running a continuous topping operation in one column and a continuous product distillation in another column. From any of the distillations the bottoms material may be worked up to recover monoethyl toluamide, which also constitutes an impurity in the original crude material.

When operating the distillation continuously, it is necessary to use a crude amide from which toluic acid has been substantially completely removed. Toluic acid forms an azeotrope with N,N-diethyltoluamide and thus contaminates the product. However, when the distillation is carried out batchwise, it is permissible to have some toluic acid present in the amide feed and prevent its distillation by addition of sodium or potassium hydroxide to the distillation pot. Alkali addition also prevents distillation of any toluic acid formed by hydrolysis of the amide either in the pot or in the column.

What I claim and desire to protect by Letters Patent is:

1. The process for preparing pure N,N-diethyl toluamide by distillation of the crude amide, from which unreacted diethylamine and toluic acid have been substantially removed but which still contains odor and color bodies and other impurities including N-ethyl toluamide, which comprises fractionally distilling the crude amide at a reboiler temperature in the range of 180–225° C. while continuously passing steam through the distillation column, and collecting a pure amide fraction in a primary condenser by passing the overhead vapors from the column through said condenser operated at a temperature in the range of 75°–110° C. for the cooling liquid leaving said condenser.

2. The process of claim 1 wherein the reboiler temperature is in the range of about 190°–200° C.

3. The process of claim 1 wherein the temperature for the cooling liquid leaving the primary condenser is in the range of about 90°–110° C.

4. The process of claim 1 wherein the pressure at the head of the distillation column is in the range of 20–100 mm.

5. The process of claim 1 wherein the mole ratio in the column of steam to amide is between about 0.5:1 and about 4:1.

6. The process of claim 1 wherein sufficient alkali metal hydroxide is introduced with the diethyl toluamide feed to neutralize any toluic acid formed by hydrolysis in the presence of steam.

References Cited in the file of this patent

UNITED STATES PATENTS

| | | |
|---|---|---|
| 2,615,833 | Dean et al. | Oct. 28, 1952 |
| 2,691,665 | Bailey | Oct. 12, 1954 |

OTHER REFERENCES

Chemical Abstracts (Harrington) 1930, vol. 24, page 94.

Morton "Laboratory Technique in Organic Chemistry," pages 142–145, 1943.

Perry "Chemical Engineer's Handbook" 1950, pages 582–583, third edition.